Dec. 8, 1925.
1,564,585
N. R. KRAUSE
WEED SCREEN FOR THRASHING MACHINES
Filed Sept. 5, 1924
3 Sheets-Sheet 1
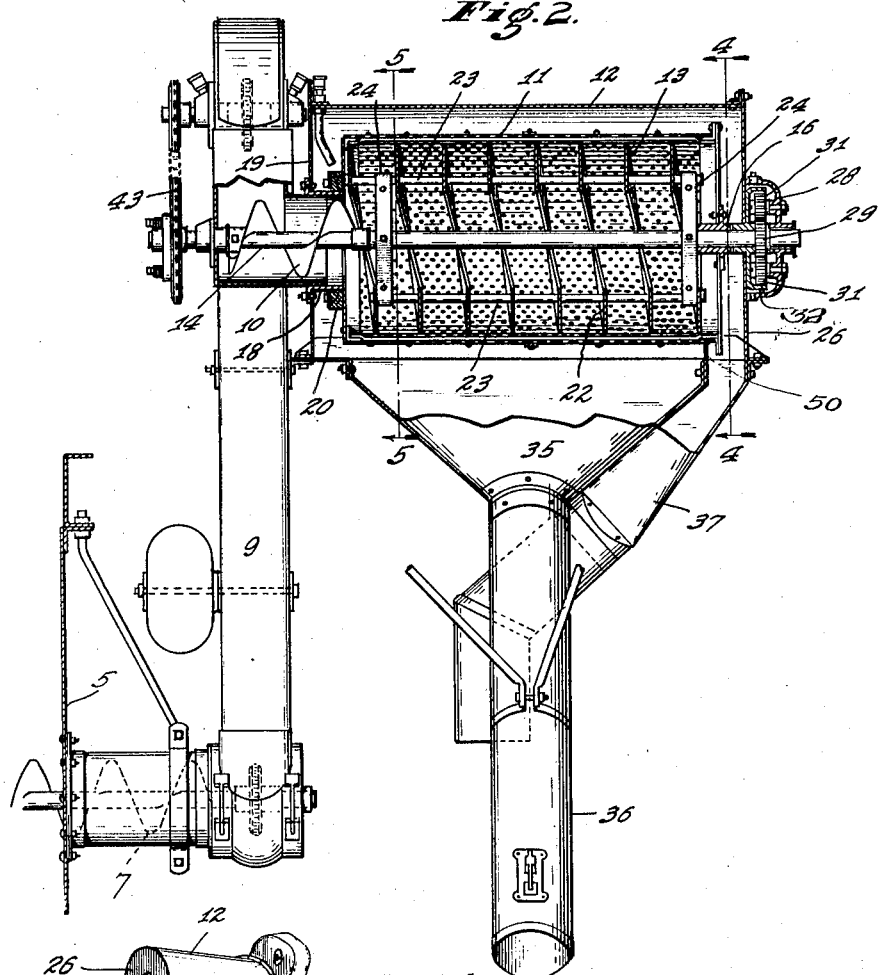
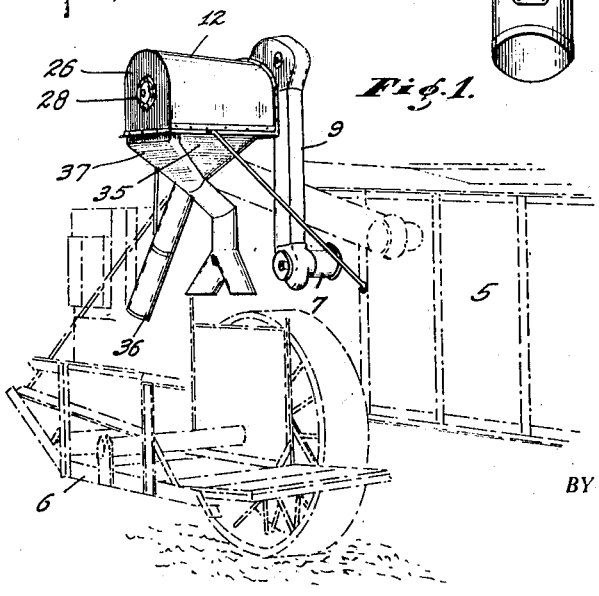
INVENTOR.
NORMAN R. KRAUSE,
BY
ATTORNEY.

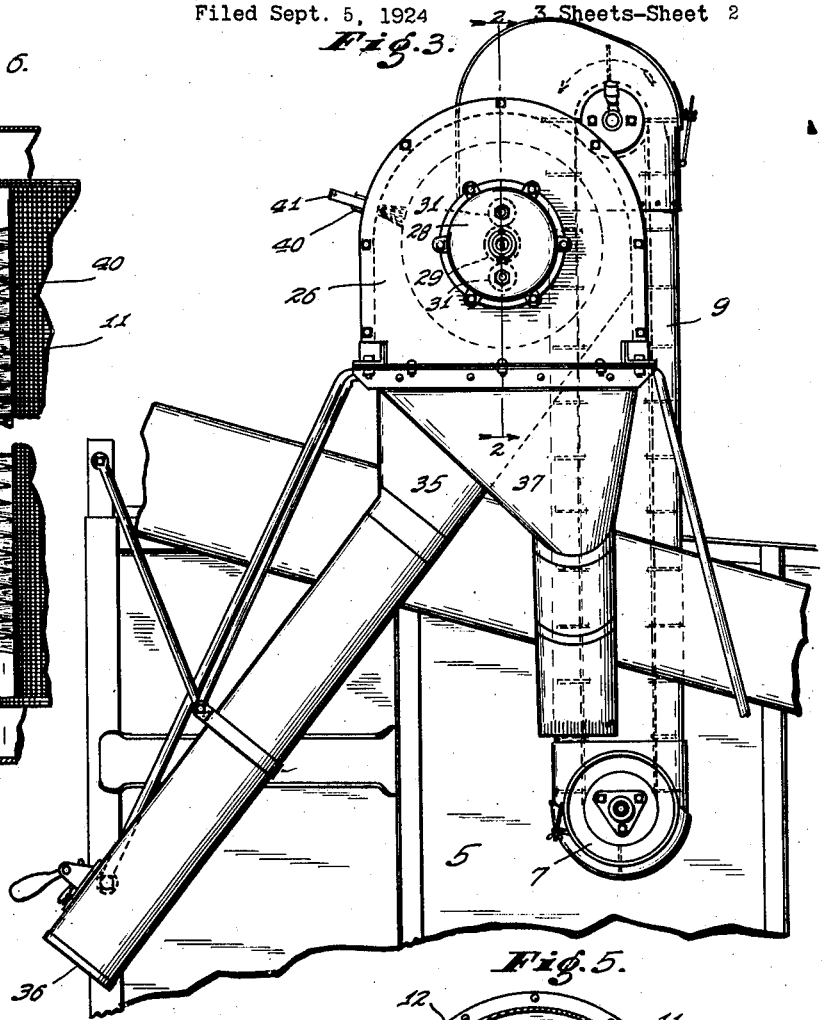

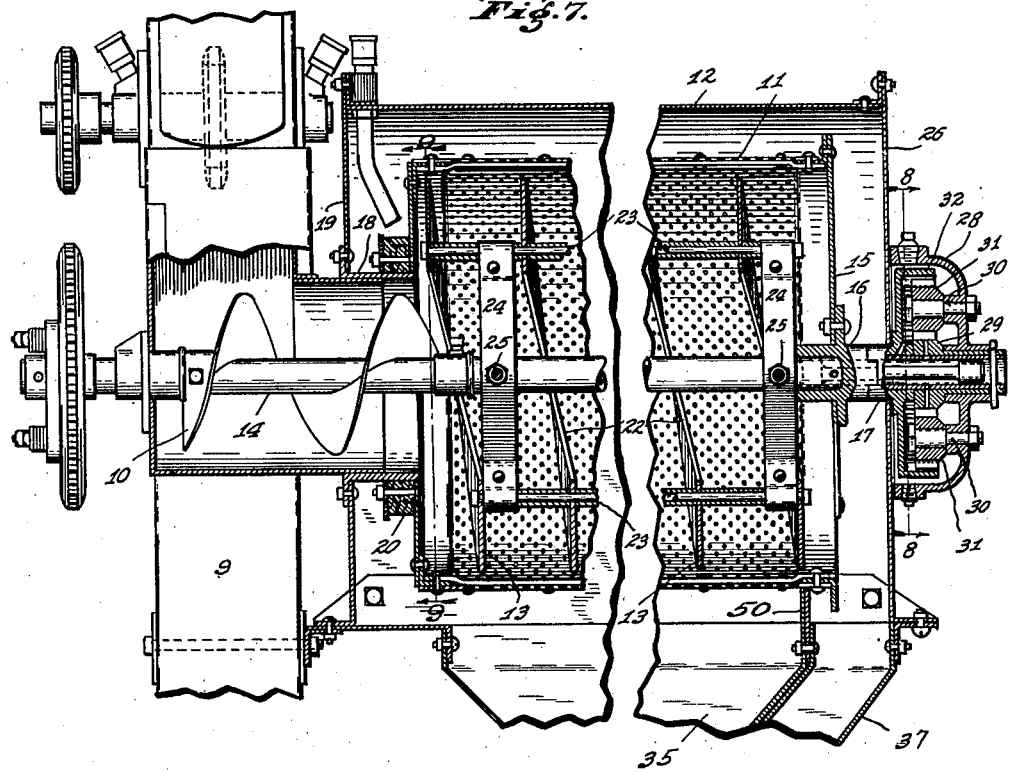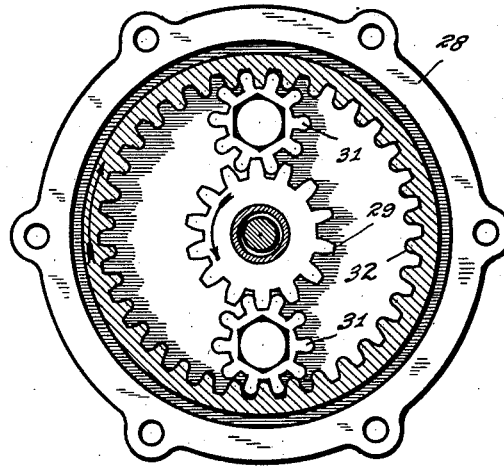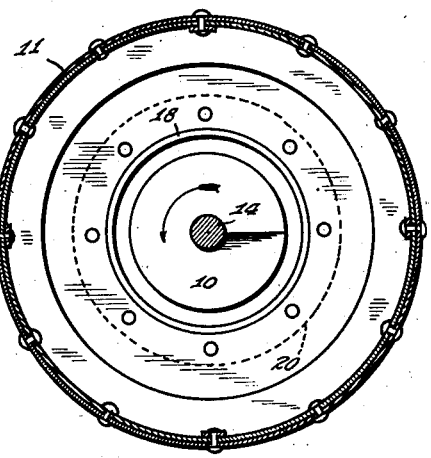

Patented Dec. 8, 1925.

1,564,585

UNITED STATES PATENT OFFICE.

NORMAN R. KRAUSE, OF RACINE, WISCONSIN, ASSIGNOR TO J. I. CASE THRESHING MACHINE COMPANY, OF RACINE, WISCONSIN, A CORPORATION.

WEED SCREEN FOR THRASHING MACHINES.

Application filed September 5, 1924. Serial No. 736,161.

*To all whom it may concern:*

Be it known that I, NORMAN R. KRAUSE, a citizen of the United States, residing at Racine, in the county of Racine and State of Wisconsin, have invented certain new and useful Improvements in Weed Screens for Thrashing Machines, of which the following is a specification.

In the operation of a combination harvester-thrasher, wheat in the field is cut at a time when weed seeds are in green condition, and, becoming mingled with wheat kernels, the mechanical separation of such seeds therefrom is extremely difficult when employing ordinary devices of which I am aware, as weed seeds are generally of a sticky and clinging nature and quickly clog vibrating sieves and the like. For the purpose of separating weed seeds and shriveled grain from wheat kernels I provide an improved rotating screen in connection with a harvester-thrasher, or otherwise as may be desired, which I have demonstrated in practice is highly efficient, and is devised in such manner as to prevent clogging by the materials and kept in cleaned condition, as will hereinafter appear.

In the accompanying drawings, forming part hereof, Figure 1 is a fragmentary perspective in chain lines of a combined harvester-thrasher, my improved rotary screen being shown in full lines attached to the thrasher; Fig. 2 an elevation of the device part of the same being shown in section as taken on the dotted line 2—2 in Fig. 3; Fig. 3 an elevation looking from the right toward the end of the device; Fig. 4 a section of the screen looking in the direction indicated by the arrows 4—4 in Fig. 2; Fig. 5 a transverse section through the rotary screen showing the cleaning brush applied thereto and taken on the dotted line 5—5 in Fig. 2; Fig. 6 a longitudinal section through said brush as seen when looking in the direction of the arrows 6—6 in Fig. 5; Fig. 7 an enlarged longitudinal section through the screen; Fig. 8 an elevation of the driving gear as seen when looking in the direction indicated by the arrows 8—8 in Fig. 7, and Fig. 9 a section on the dotted line 9—9 of Fig. 7.

In said drawings, the portions marked 5, 6, indicate thrasher and harvester elements, respectively. A grain auger, 7, arranged transversely of the thrasher projects outwardly therefrom and which discharges thrashed grain from the machine to the ordinary elevator, 9, attached thereto, which in turn conveys the grain upwardly in a well known manner and discharges it into the short spiral conveyor, 10, Fig. 2.

My improvement consists essentially in a rotary screen as a whole comprising the drum, 11, encased in housing, 12, in which drum is positioned a large auger, 13, the latter together with spiral conveyor, 10, being mounted upon shaft, 14, thus constituting a continuous conveyor from elevator 9 through the screen drum 11. Said drum 11 at its driven end is carried by a spider comprising the arms, 15, which are secured to a clutch faced hub, 16, engaging with driving hub, 17, as will be further explained. The opposite end of said drum is mounted upon a sleeve, 18, secured to head, 19, of housing 12, and wooden or other blocks, 20, are fastened to said rotating drum and revolve with it about sleeve 18, which constitutes the journal for the floating end of said rotary drum. The large auger 13 comprising the flights, 22, and braces, 23, is secured to shaft 14 by the spiders 24, clamped to said shaft by the adjusting eye bolts, 25, so as to turn with the shaft, which auger in connection with spiral conveyor, 10, forms a continuous conveyor as heretofore indicated. The outer stationary head, 26, of screen housing 12 has secured thereto the gear casing, 28, within which is enclosed the pinion, 29, keyed onto shaft 14. Loosely mounted on studs, 30 in said casing 28 and meshing with pinion 29 are intermediate pinions, 31, which in turn drive the internal clutch gear, 32, (the hub 17 of which engages with clutch 16) at reduced speed from that of auger 13 and rotates said drum 11 in reverse direction to that of said auger, said clutch gear 32 being loosely mounted on shaft 14 and clutching with hub 16 of weed screen spider 15.

Depending from casing 12 is a hopper, 35, to which a spout, 36, is attached for delivering weed seeds and the like to sacks or other receptacles, while at the outer side of said casing a spout, 37, is attached for discharging the grain which has traveled across the screen and which passes between the spiders 15 to the space communicating with said spout 37.

As heretofore indicated, considerable difficulty is experienced by weed seeds and other materials sticking into or clinging to the screen drum perforations or interstices of wire meshing when the latter is used, and to remedy this condition I provide a brush, 40, which is inserted through casing, 12, longitudinally of screen drum 11, and maintained in position by spring holders, as 41, so that the wires or bristles of the brush will be constantly pressed into said drum with the result that as the latter is rotating such material will be brushed away and the screen thus kept in cleaned condition, and the finer particles thus permitted to pass through the drum perforation without obstruction.

As the elevator 9 is driven from its lower end, it transmits motion to the rotary screen by means of the sprocket-and-chain system, 43, (Fig. 2), and as grain is delivered from said elevator to spiral conveyor 10 it is propelled thereby inwardly to the rotary drum and is caused to travel through the same by the action of auger 13. As said auger screws the grain in the direction of grain spout 37 the rotary screen 11 is rotating slowly in the opposite direction, which action severely agitates the material and sifts it thoroughly so that the fine weed seeds, shrivelled grain and minute foreign particles fall through the weed spout 36, while the grain separated therefrom is moved to the outer end of the drum and delivered into grain spout 37 through the outlet formed by the wall, 50, and head 26 of the screen housing. In practice I have demonstrated the advantage of employing a rotating weed screen in which the auger rotates in one direction and the screen drum in the other, both at varying speeds for the reason that the separation is very rapid and much more complete than by other methods which have come to my notice.

I claim as my invention:

1. The combination, with an elevator, of a weed screen comprising a housing, a shaft therein extending to said elevator and having a spiral conveyor thereon extending from said elevator, an auger on said shaft co-operating with said spiral conveyor for propelling material, a screen drum surrounding said auger, and means independent of said auger for rotating said drum in a direction opposite to that of said auger.

2. The combination, with an elevator, of a weed screen comprising a housing, a shaft in said housing, a spiral conveyor on said shaft extending into said elevator, an auger on said shaft cooperating with said conveyor for propelling material, a screen drum on said shaft and surrounding said auger, means for rotating said shaft, and means for rotating said drum in a direction opposite to the rotation of said shaft.

3. The combination, with an elevator, of a weed screen comprising a casing, spouts dependent from said casing, a shaft mounted in said casing and extending to said elevator, a spiral conveyor on said shaft extending into said weed screen, spiders on said shaft, braces supported by said spiders, flights mounted on said braces, a screen drum surrounding said flights, driving mechanism on said casing clutched to said screen drum, and means for operating said elevator to rotate said shaft and said drum in opposite directions.

4. In a weed screen, a housing, a screen drum therein embodying a clutch member, a shaft for supporting said drum, an auger in said drum and mounted on said shaft, driving mechanism embodying a clutch engaging said clutch member, and means for driving said shaft and auger in one direction whereby said driving mechanism rotates said drum in an opposite direction.

5. In a weed screen, a shaft, a spiral conveyor mounted on said shaft, a screen drum mounted on said shaft and surrounding said conveyor, driving mechanism mounted on said shaft and connected to said drum for rotating the same oppositely to said conveyor, and a brush adapted to engage said drum for cleaning the same.

In testimony whereof I affix my signature.

NORMAN R. KRAUSE.